United States Patent
Ichiyanagi

[11] Patent Number: 5,867,769
[45] Date of Patent: Feb. 2, 1999

[54] TRANSMISSION POWER CONTROL APPARATUS IN EARTH STATION FOR SATELLITE COMMUNICATION

[75] Inventor: Kazuhiro Ichiyanagi, Kawasaki, Japan

[73] Assignee: Fujitsu Limited, Kanagawa, Japan

[21] Appl. No.: 641,485

[22] Filed: May 1, 1996

[30] Foreign Application Priority Data

Aug. 2, 1995 [JP] Japan ................................ 7-197236

[51] Int. Cl.[6] .......................... H04B 01/00; H04B 07/00; H01Q 11/12
[52] U.S. Cl. .......................... 455/69; 455/67.1; 455/115; 455/505
[58] Field of Search ................................ 455/9, 10, 13.4, 455/63, 69, 115, 116, 126, 505, 506, 67.1, 67.3

[56] References Cited

U.S. PATENT DOCUMENTS

| | | | |
|---|---|---|---|
| 4,910,792 | 3/1990 | Takahata et al. | 455/69 |
| 4,941,199 | 7/1990 | Saam | 455/69 |
| 5,060,292 | 10/1991 | Ayukawa et al. | 455/115 |
| 5,081,713 | 1/1992 | Miyazaki | 455/116 |
| 5,559,790 | 9/1996 | Yano et al. | 370/18 |
| 5,574,982 | 11/1996 | Almgren et al. | 455/69 |
| 5,574,984 | 11/1996 | Reed et al. | 455/69 |

FOREIGN PATENT DOCUMENTS

| | | |
|---|---|---|
| 57-132437 | 8/1982 | Japan . |
| 63-132536 | 6/1988 | Japan . |
| 2-95033 | 4/1990 | Japan . |
| 4-170232 | 6/1992 | Japan . |

*Primary Examiner*—Tommy P. Chin
*Assistant Examiner*—Anand Rao
*Attorney, Agent, or Firm*—Helfgott & Karas, PC.

[57] ABSTRACT

A control status monitor/decision unit is added to a transmission power control apparatus which determines a transmission power level of a transmission signal to be output from an antenna via a transmission system and controls the same by referring to a received signal from the antenna obtained via a reception system. The unit monitors the control status in the control apparatus and performs the control of the optimum transmission power level according to this control status. By this, a further higher channel quality than that of the conventional apparatus can be maintained.

8 Claims, 15 Drawing Sheets

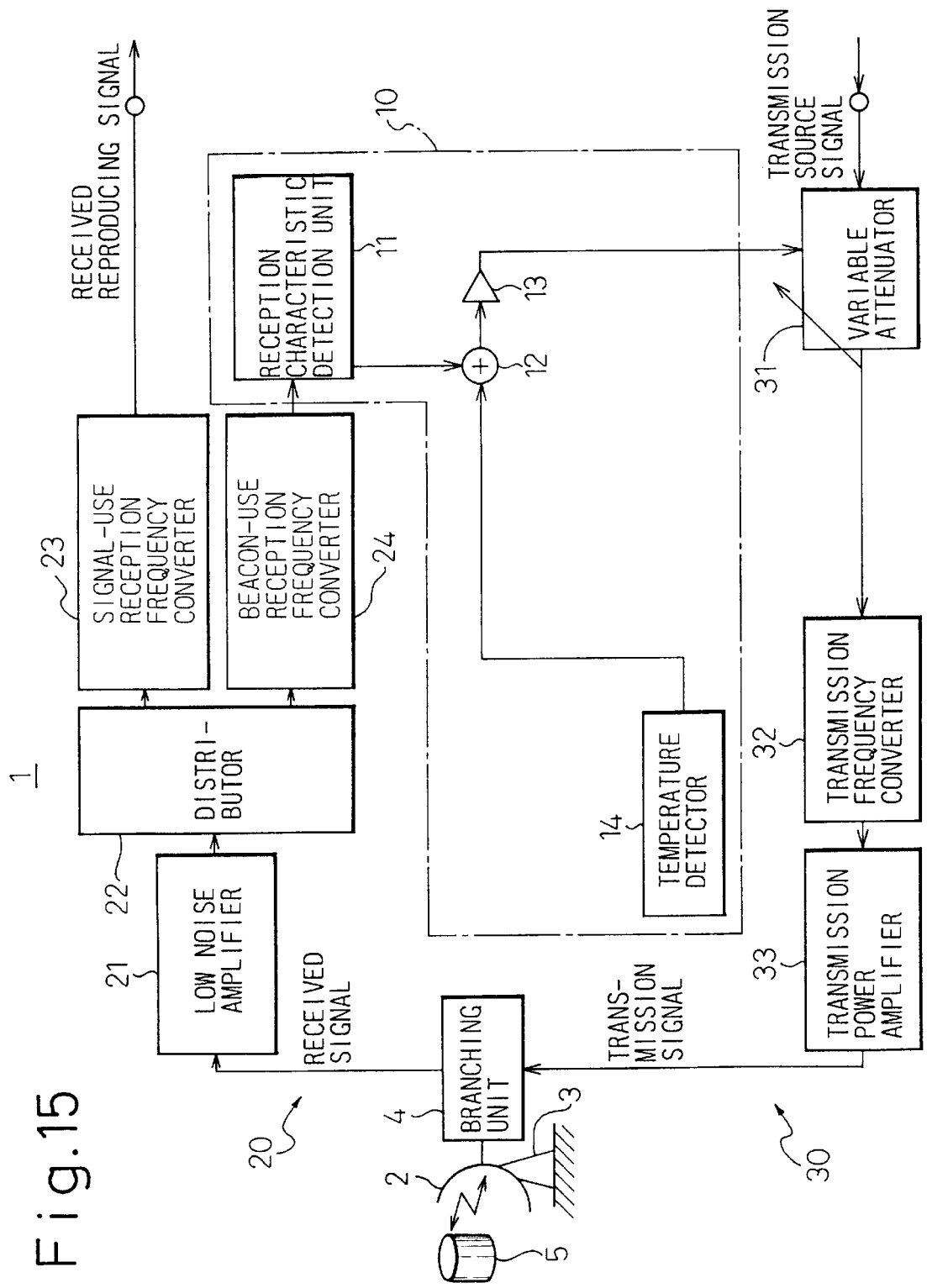

TRANSMISSION POWER CONTROL APPARATUS IN EARTH STATION FOR SATELLITE COMMUNICATION

BACKGROUND OF THE INVENTION

1. Field of the Invention

The present invention relates to a transmission power control apparatus in an earth station for satellite communication.

In satellite communication, a plurality of earth stations will transmit and receive signals via a single satellite. Therefore the transmission power from the earth stations must be strictly managed so as not to seriously disturb the other communication channels.

Also, satellite communication is carried out through space transmission paths, therefore it is different from optical fiber communication etc. The channel quality thereof is conspicuously affected by weather conditions between the satellite and the earth stations. For this reason, the transmission power from the earth stations must be controlled according to the changes in the weather conditions.

The present invention refers to a transmission power control apparatus for performing the control of the transmission power.

2. Description of the Related Art

As will be explained in detail below by referring to the drawings, in general, a satellite communication earth station (hereinafter also simply referred to as an earth station) incorporates a transmission power control apparatus. This control apparatus is connected to external apparatuses such as an antenna via a reception system and a transmission system. Also, this control apparatus includes a reception characteristic detection unit for the received signal obtained from the reception system, for example, a beacon signal. The transmission power level in the transmission system is variably controlled according to the output from this detection unit.

The transmission power control apparatus having a conventional configuration mentioned above merely feeds back the characteristic of the received signal at the reception system, detected by the reception characteristic detection unit, to the transmission system as it is and suffers from a problem that it cannot meet demands for maintaining a further higher grade of channel quality.

SUMMARY OF THE INVENTION

Accordingly, an object of the present invention is to provide a transmission power control apparatus in an earth station for satellite communication which can maintain a further higher grade of channel quality in comparison with the conventional apparatus.

To attain the above object, the present invention adds a control status monitor/decision means to a transmission power control apparatus which determines the transmission power level of the transmission signal to be output from an antenna via a transmission system and controls the same by referring to the received signal from the antenna obtained via a reception system. This means monitors the control status in the control apparatus and controls to the optimum transmission power level according to this control status.

BRIEF DESCRIPTION OF THE DRAWINGS

The above object and features of the present invention will be more apparent from the following description of the preferred embodiments with reference to the accompanying drawings, wherein:

FIG. 15 is a view showing an example of an earth station for satellite communication including a conventional transmission power control apparatus.

DESCRIPTION OF THE PREFFERRED EMBODIMENTS

Figure 1:
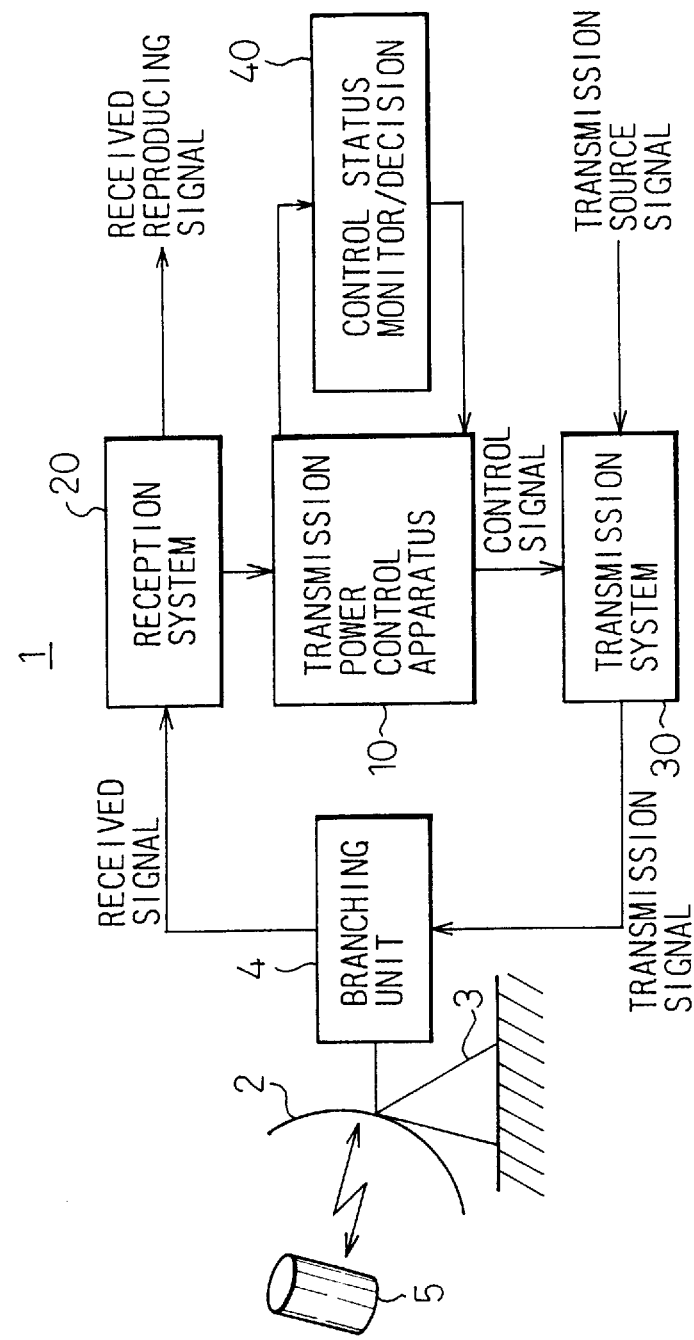
FIG. 1 is a view showing a fundamental configuration of a transmission power control apparatus according to the present invention.

Before describing the embodiments of the present invention, the related art and the disadvantages therein will be described with reference to the related figures.

FIG. 15 is a view showing an example of an earth station for satellite communication including a conventional transmission power control apparatus. In the figure, reference numeral 1 is an earth station for satellite communication (hereinafter, also simply referred to as an earth station). A transmission power control apparatus 10 is incorporated in it. This apparatus 10 is connected to external apparatuses via a reception system 20 and a transmission system 30. The external apparatuses are an illustrated antenna 2 facing a satellite 5, an antenna driving unit (tracking unit) 3 which makes the beam of the antenna 2 track a drifting satellite 5, and a branching unit 4 which separates the received signal from the antenna 2 and a transmission signal to the antenna 2.

In the reception system 20, the received signal from the antenna 2 is amplified by a low noise amplifier 21, then the result is distributed by a distributor 22 to a first system for obtaining a main received reproduction signal (for example 70 MHz) and a second system for extracting the received signal for performing the transmission power control, for example, a beacon signal from the satellite. A signal-use reception frequency converter 23 is provided in the first system, and a beacon-use reception frequency converter 24 which extracts the beacon signal of for example 12.75 GHz and performs down-conversion is provided in the second system.

On the other hand, the transmission system 30 is provided with a variable attenuator 31 receiving as its input a transmission source signal and variably controlling the transmission power level of the transmission signal, for example, a variable voltage attenuator; a transmission frequency converter 32 which up-converts the frequency of the transmission signal subjected to the transmission power level control to an up-link frequency; and a transmission power amplifier 33 which amplifies the power of the output of this converter 32 and supplies the same to the antenna 2.

Viewing the transmission power control apparatus 10 according to the present invention, this apparatus 10 comprises a reception characteristic detection unit 11 of the received signal obtained from the reception system 20, for example, the beacon signal, and an amplifier 13 for amplifying the detected output from this detection unit 11, for example, an operational amplifier, and changes the attenuation amount in the variable attenuator 31 mentioned before according to the variation of this amplified output.

As mentioned before, the channel quality in the satellite communication is influenced by the weather conditions between the satellite 5 and the antenna 2 of the earth station 1, for example, rainy conditions. For example, at the time of a strong rain, the attenuation caused by the rain is large and therefore the transmission signal must be emitted from the antenna 2 with a large transmission power. Conversely, at the time of a weak rain, it is necessary to lower the transmission power to make it small and emit the transmission signal from the antenna 2. This is because, disturbance will be caused at the other communication channels if the transmission power is large as it is.

In this case, when performing the control of the transmission power, there arises a problem of how the level should be determined, but in this transmission power control apparatus 10, there is adopted a method of detecting the fluctuation of the reception level of the down-link side received signal received from the antenna 2 and estimating the transmission level of the up-link side transmission signal. Attention is paid to the fact that both of the down-link and up-link are always under almost the same weather conditions.

There also exist other factors controlling the level of the transmission power. The level of the transmission power is easily influenced by temperature fluctuations at the transmission system 30, particularly, the temperature fluctuations at the transmission frequency converter 32 and the transmission power amplifier 33 mentioned before, therefore the ambient temperatures of these converter 32 and amplifier 33 are detected at a temperature detector 14, are applied to an adder 12, for example a voltage adder, and added to the detection output from the reception characteristic detection unit 11 mentioned before. By this, a further higher precision of control of the transmission power is realized. This reception characteristic detection unit 11 is a level detector for detecting the reception level of the received signal as a concrete example. Alternatively, it is a C/N detector detecting the so-called carrier vs. noise ratio (C/N) of the received signal. Alternatively, it is provided with both of these level detector and C/N detector.

The transmission power control apparatus of the conventional configuration mentioned above merely feeds back the characteristic of the received signal at the reception system 20, detected by the reception characteristic detection unit 11, as it is to the transmission system 30 and suffers from the above problem such that it cannot meet the demands for maintaining a further higher grade of channel quality.

The present invention provides a transmission power control apparatus in an earth station for satellite communication which can maintain the channel quality at a further higher grade in comparison with a conventional apparatus.

FIG. 1 is a view showing a fundamental configuration of a transmission power control apparatus according to the present invention. In the figure, the same constituent elements as those explained by referring to FIG. 15 are given the same reference numerals or symbols (the same is true for the following). Accordingly, the constituent element which is newly shown in the figure is a control status monitor/decision means 40.

The control status monitor/decision means 40 first monitors the control status inside the transmission power control apparatus 10. Then, it decides the optimum transmission power level according to that monitored control status, outputs a control signal based on the result of this decision to the transmission system 30, and sets the transmission power level to the optimum value thereof.

Figure 2:
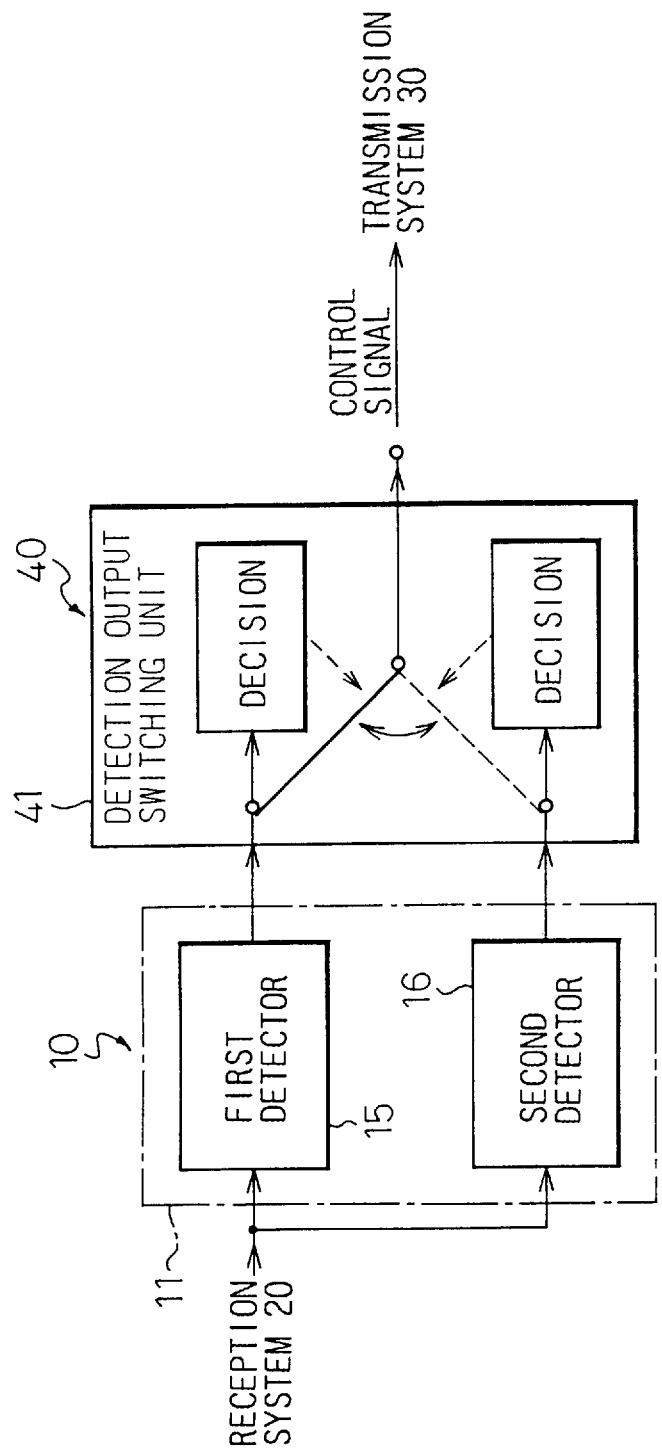
FIG. 2 is a schematic view of a first embodiment according to the present invention.

FIG. 2 is a schematic view showing a first embodiment according to the present invention. According to the first embodiment of the present invention, the reception characteristic detection unit 11 of the transmission power control apparatus 10 is constituted by a first reception characteristic detector 15 and a second reception characteristic detector 16.

On the other hand, the control status monitor/decision means 40 is constituted by a detection output switching unit 41. This detection output switching unit 41 supplies the detected output from one of the first reception characteristic detector 15 and the second reception characteristic detector 16 as the control signal shown in FIG. 1 to the transmission system 30 in a normal mode. At this time, the detection output switching unit 41 monitors whether or not the values of the detected outputs from these detectors 15 and 16 become out of a preliminarily determined normal range. When deciding that they become out of that range, it performs switching to the detected output from the other of the detector 15 and detector 16 and uses the same as the above control signal.

Note that, as will be mentioned in the following concrete example, the first reception characteristic detector 15 is for example a C/N detector, and the second reception characteristic detector 16 is for example a level detector. The user freely determines which detector is to be used in the normal mode.

The meaning of this first embodiment resides in the following point. In the above conventional transmission power control apparatus 10, where a failure occurs in the C/N detector or the level detector, there is a possibility that the transmission power of the transmission signal will conspicuously change. Where the failure of the C/N detector or the level detector occurs in a direction increasing this transmission power, not only does the wave become an illegal strong electric wave, but also it becomes a cause of generation of spurious signals by an intermodulation product (IM) in the transmission power amplifier 33, and thus it will cause serious disturbance to the other communication channels. Also, where the failure of the C/N detector or the level detector occurs in a direction decreasing the transmission power thereof, the communication channel used for the communication between a home earth station and the opposing earth station will go down.

Thus, according to the first embodiment, even if a failure occurs in the reception characteristic detection unit 11, a higher channel quality than that of the conventional apparatus can be maintained.

Figure 3:
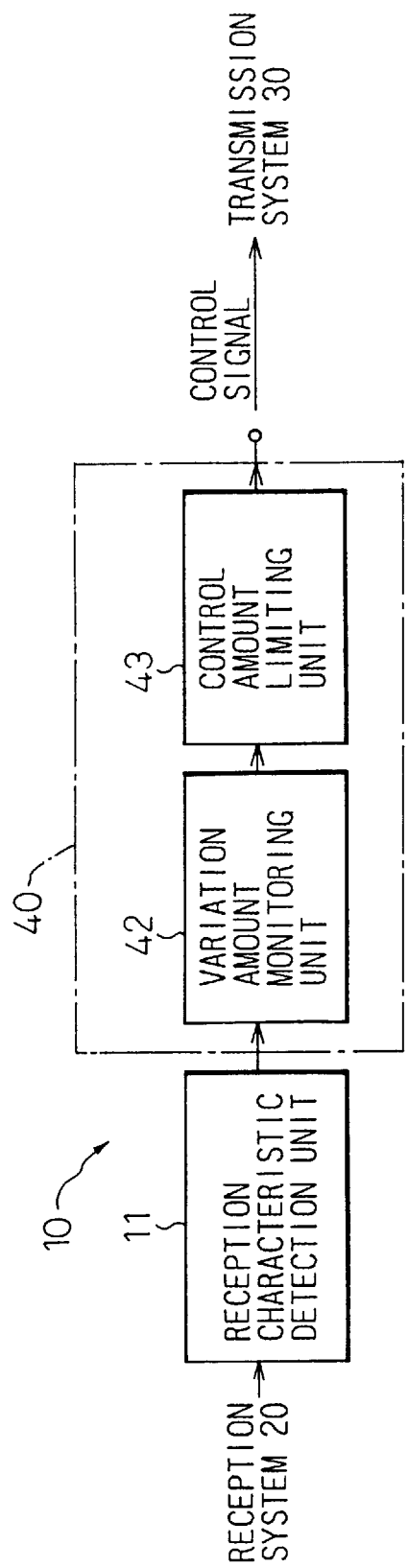
FIG. 3 is a schematic view showing a second embodiment according to the present invention.

FIG. 3 is a schematic view showing the second embodiment according to the present invention. According to the second embodiment of the present invention, the control status monitor/decision means 40 shown in FIG. 1 is constituted by a variation amount monitoring unit 42 and a control amount limiting unit 43.

The variation amount monitoring unit 42 first periodically samples the detected output from the reception characteristic detection unit 11. Note that, there is no problem even if the detected output from this detection unit 11 is the detected output from the C/N detector or the detected output from the level detector.

This variation amount monitoring unit 42 calculates the amount of variation between a value sampled at this time and a value which was sampled at a previous time. Further, it monitors whether or not that amount of variation is within a preliminarily determined normal range. The result of this monitoring is given to the control amount limiting unit 43.

When deciding that the amount of variation is not within the preliminarily determined normal range, according to the above result of the monitoring, the control amount limiting unit 43 limits the amount of control to a preliminarily determined normal amount of control so as to reduce the magnitude of the amount of control of the transmission power level which should be designated by the control signal of FIG. 1.

The meaning of this second embodiment resides in the following point. In the conventional transmission power control apparatus 10, the detected output from the C/N detector or the level detector depends upon the receiving level of the received signal at the earth station 1, but this receiving level greatly fluctuates depending upon the rain conditions across the down-link. Further, also the error of the C/N detector or level detector per se is added, and the fluctuation thereof becomes much larger. However, in the conventional transmission power control apparatus 10, the detected output from the C/N detector or the level detector is output to the adder 12 as it is, and therefore when the detected output thereof becomes abnormally large, an abrupt fluctuation of the transmission power level will occur. There is a possibility that such an abrupt fluctuation of the transmission power level will cause an out-of-lock state in a demodulator in the opposing earth station of the communication.

Thus, according to the second embodiment, even if such an excessive detected output is generated, this is not responded to as it is, a control signal obtained by limiting the amount of control of the transmission power level to make it small can be given to the transmission system 30, and a higher channel quality than the related art is maintained.

Figure 4:
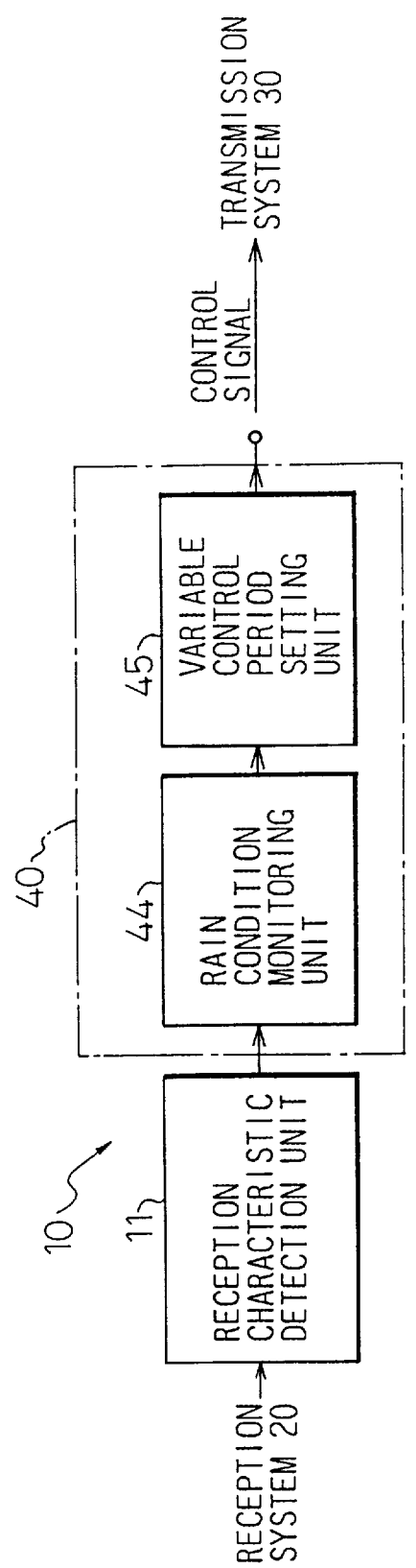
FIG. 4 is a schematic view showing a third embodiment according to the present invention.

FIG. 4 is a schematic view of a third embodiment according to the present invention. According to the third embodiment of the present invention, the control status monitor/ decision means 40 shown in FIG. 1 is constituted by a rain condition monitoring unit 44 and a variable control period setting unit 45.

The rain condition monitoring unit 44 monitors the detected output from the reception characteristic detection unit 11. This detection unit 11 is for example the already mentioned C/N detector or level detector, and the detected output thereof precisely detects the rain condition in the space transmission paths between the antenna 2 and the satellite 5. Namely, the detected output shows a strong rain, weak rain, or fine weather. This monitoring unit 44 monitors such rain conditions.

The variable control period setting unit 45 obtains the result of monitoring by the rain condition monitoring unit 44 and variably sets the output period of the control signal shown in FIG. 1, that is, the control period of the transmission power level. The method of variation is as follows.

When the rain conditions are those of a strong rain, the control period is made short. Conversely, when the rain conditions are those of a light rain or fine weather, the control period is made long.

The meaning of this third embodiment resides in the following point. In the conventional transmission power control apparatus 10, there is no difference in the method of output of the control signal between fine weather and rain. However, at the time of fine weather, the error component of the low noise amplifier, beacon-use frequency converter, and the C/N detector or level detector exerts a great influence upon the control of the transmission power.

On the other hand, it was seen from experiments that it is better if a difference is imparted to the method of the output of the control signal between fine weather and rain. The factor thereof resides in an error component possessed by the low noise amplifier 21 per se in the reception system 20, and an error component possessed by the C/N detector per se or the level detector per se constituting the reception characteristic detection unit 11.

Under light and strong rain conditions, the detected output representing the rain is considerably deviated from the detected output at the time of fine weather. For this reason, the error component thereof is not noticeable under light and strong rain conditions. However, at the time of fine weather, the level of the detected output is small, and therefore the error component thereof is no longer negligible. In this case, it is seen that, as the control period (clock rate) mentioned above is made higher, the error component thereof becomes larger.

Thus, in the third embodiment, sampling is carried out at, for example, one second intervals, at the time of light and strong rain as in the related art, and sampling is carried out at, for example, 3 second intervals, at the time of fine weather, that is, a difference is given to the control period between the time of light and strong rain and the time of fine weather, and they are made variable short or long.

Figure 5:
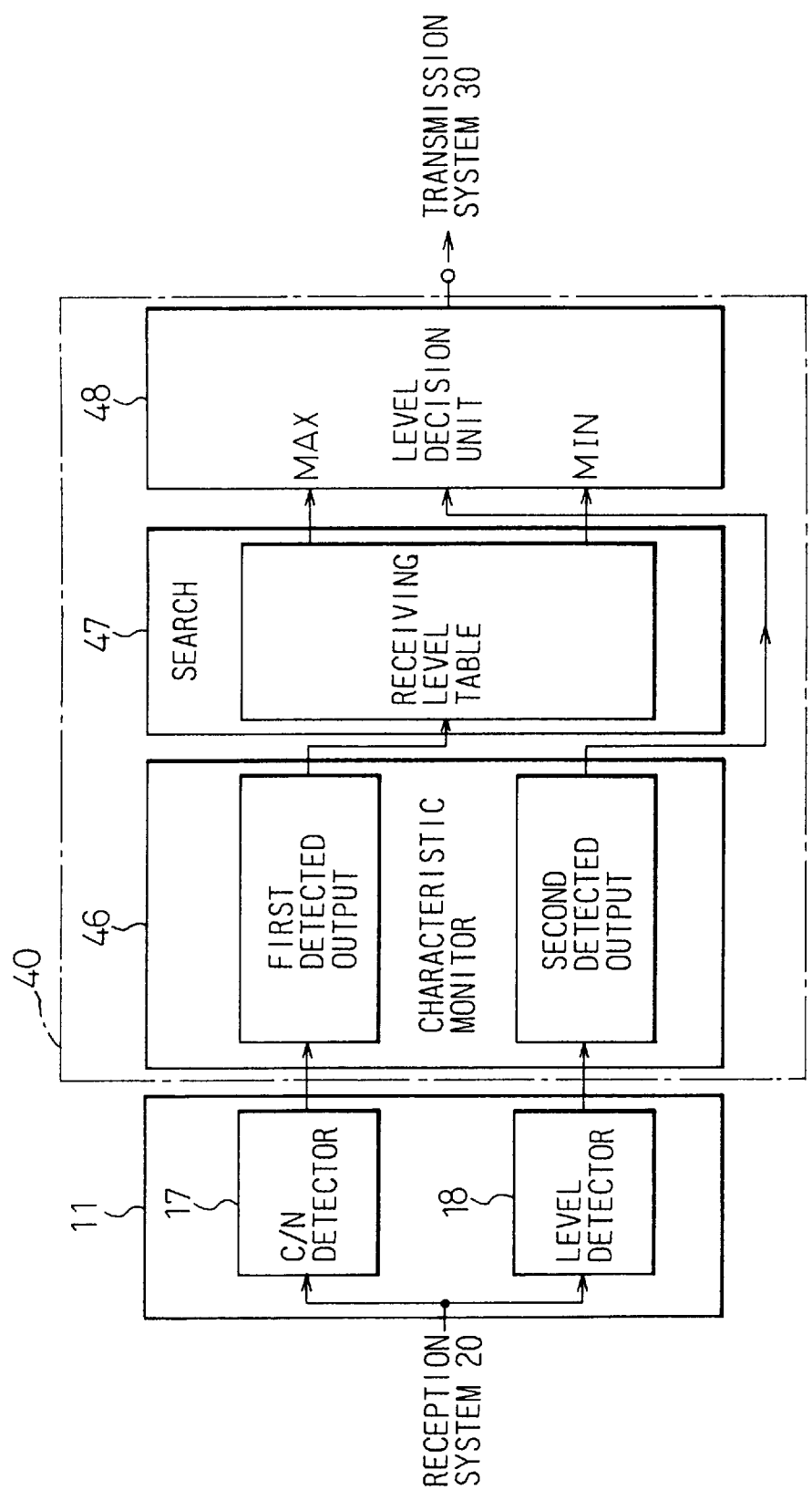
FIG. 5 is a schematic view showing a fourth embodiment according to the present invention.

FIG. 5 is a schematic view of the fourth embodiment according to the present invention. In the figure, a first detected output (carrier vs. noise ratio C/N of the received signal) from the C/N detector 17 constituting the reception characteristic detection unit 11 and a second detected output (reception level of the received signal) from the level detector 18 are monitored by a characteristic monitoring unit 46.

The first detected output (C/N) is input to a receiving level table in a table searching unit 47, and the second detected output (level) is input to a level decision unit 48.

The receiving level table preliminarily stores the maximum value (MAX) and the minimum value (MIN) of the reception level which can exist under the C/N values corresponding to various different C/N values.

When the first detected output (C/N) is given, the table searching unit 47 outputs the maximum value (MAX) and the minimum value (MIN) of the reception level corresponding to the thus given C/N to a level decision unit 48.

The level decision unit 48 suspends the control of the transmission power level at the transmission system 30 when deciding that the second detected output from the monitoring unit 46 becomes out of the range between the above and MIN.

The meaning of this fourth embodiment resides in the following point. At the time of a failure in the antenna driving unit 3 or the low noise amplifier 21, if they are left to stand as they are, a reduction of level of the received signal occurs, the transmission power control apparatus 10 erroneously decides that attenuation caused by rain is generated in free space, and performs compensation of an unnecessarily large transmission power. In such a case, a power of more than a prescribed level reaches a transponder in the communication satellite, which becomes a cause of cross modulation distortion more than necessary.

Thus, according to the fourth embodiment, before such a situation is caused, the control of the transmission power level can be suspended. In this fourth embodiment, attention has been paid to the following fact.

In general, it is known that, when the diameter of the antenna 2 and the characteristic of the low noise amplifier 21 are known, the characteristic of the C/N vs. reception level at the time of fine weather inherent in such an antenna 2 and low noise amplifier 21 may be found by calculation. That is, when the C/N is known, the reception level corresponding to this C/N is found by calculation. When the value obtained by this calculation is defined as a true value, the maximum value (MAX) and the minimum value (MIN) are determined by adding positive and negative error amounts to this true value. These values are preliminarily stored in the receiving level table. Note that, the error amount takes a different value when the earth station system changes, and therefore it is necessary to preliminarily measure the same for every system manually.

Figure 6:
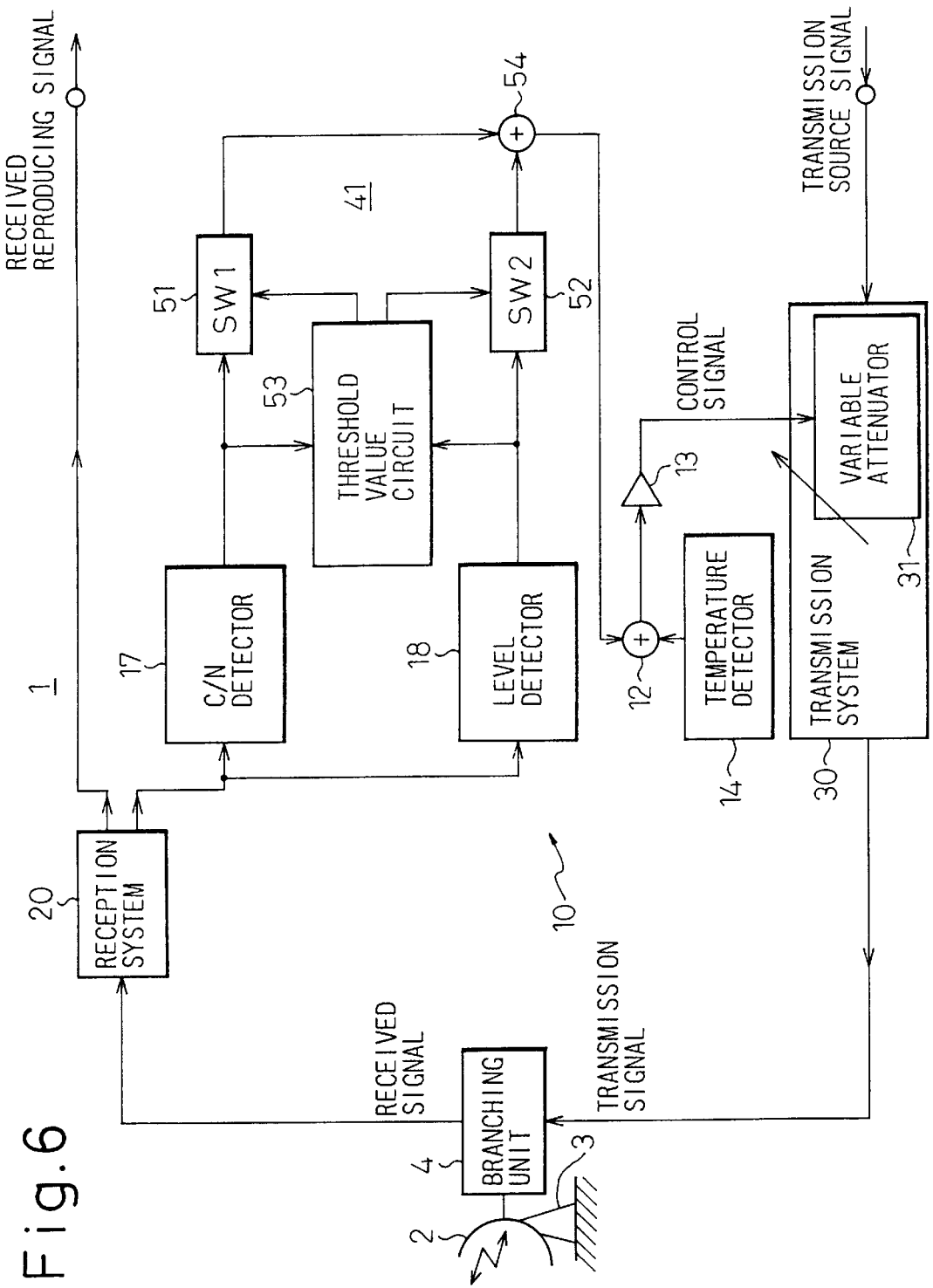
FIG. 6 is a view showing a concrete example of the first embodiment according to the present invention.

FIG. 6 is a view showing a concrete example of the first embodiment according to the present invention. In the figure, the first and second reception characteristic detectors 15 and 16 of FIG. 2 are shown as a C/N detector 17 and a level detector 18, respectively. Also, the detection output switching unit 41 of FIG. 2 is shown as a first switch (SW1) 51, a second switch (SW2) 52, a threshold value circuit 53, and an adder 54.

The threshold value circuit 53 has a range of the C/N (carrier vs. noise ratio) which is possessed by the received signal from the reception system 20 when the received signal is in the normal communication state as a first threshold value. Also, it has a range of the level value possessed by the received signal when the received signal is in the normal communication state as a second threshold value.

The threshold value circuit 53 outputs a switching signal for alternatively turning on only one of the first switch 51 and the second switch 52.

Now assume that the threshold value circuit 53 selects the side of the C/N detector 17, that is, the first switch 51. Then, the received signal detected at the C/N detector 17 reaches the above adder 12 via the adder 54 and becomes a control signal.

When the threshold value circuit 53 detects that the C/N value from the C/N detector 17 is a value which cannot usually exist by the first threshold value, the first switch 51 is opened. Simultaneously with this, the threshold value circuit 53 closes the second switch 52 after detecting and confirming that the detection level of the received signal from the level detector 18 is a normal value by the second threshold value, and thereafter this detection level is defined as the above control signal. Thereafter, the cause of the abnormal C/N value from the C/N detector 17 is found and eliminated.

If the threshold value circuit 53 detects that the detection level from the level detector 18 is a value which cannot usually exist, the second switch 52 is opened, and the first switch 51 is closed by the same operation as that mentioned before.

Figure 7:
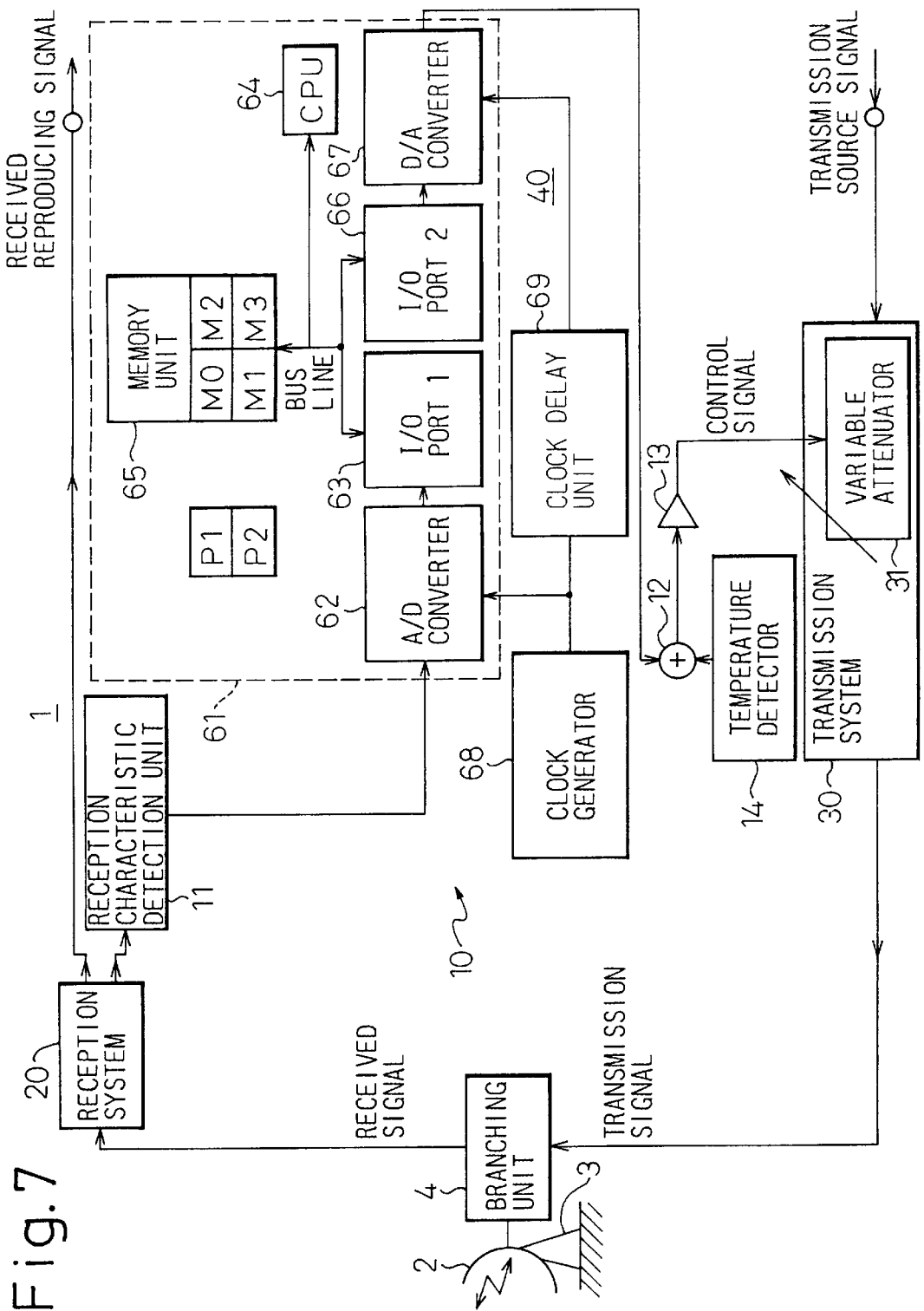
FIG. 7 is a view showing a concrete example of the second embodiment according to the present invention.

FIG. 7 is a view showing a concrete example of the second embodiment according to the present invention. In the figure, 61 is a digital signal processing unit, which digital signal processing unit 61 executes a variation amount monitoring process P1 corresponding to the function of the variation amount monitoring unit 42 shown in FIG. 3 and a control amount limiting process P2 corresponding to the function of the control amount limiting unit 43 similarly shown in FIG. 3 by software processing.

The detected output (analog) from the reception characteristic detection unit 11 is sampled by an A/D converter 62 with a clock cycle from a clock generator 68 and then converted to a digital signal. This digital signal is input to a first I/O port 63.

A CPU 64, which is the heart of the digital signal processing unit 61, executes the variation amount monitoring process P1 and the control amount limiting process P2 in association with the memory unit 65 and outputs the result of the computation to a second I/O port 66. A D/A converter 67 samples the digital signal output to this second I/O port 66 by a clock from a clock delay unit 69, and then converts the same to an analog signal. This analog signal becomes the above control signal to the transmission system 30.

Even if the transmission period of the control signal, that is, the control period, is varied according to the rain conditions, complete synchronization must be always maintained between the processing at the A/D converter 62 and the processing at the D/A converter 67. For this reason, it is convenient if the clock is given to these converters 62 and 67 from the same clock generator 68 (the clock cycle is made variable). However, processing delay of an amount of the time for computation by the CPU 64 must be given between the processings at the converter 62 and the converter 67. For this purpose, a clock delay unit 69 is provided.

Figure 8:
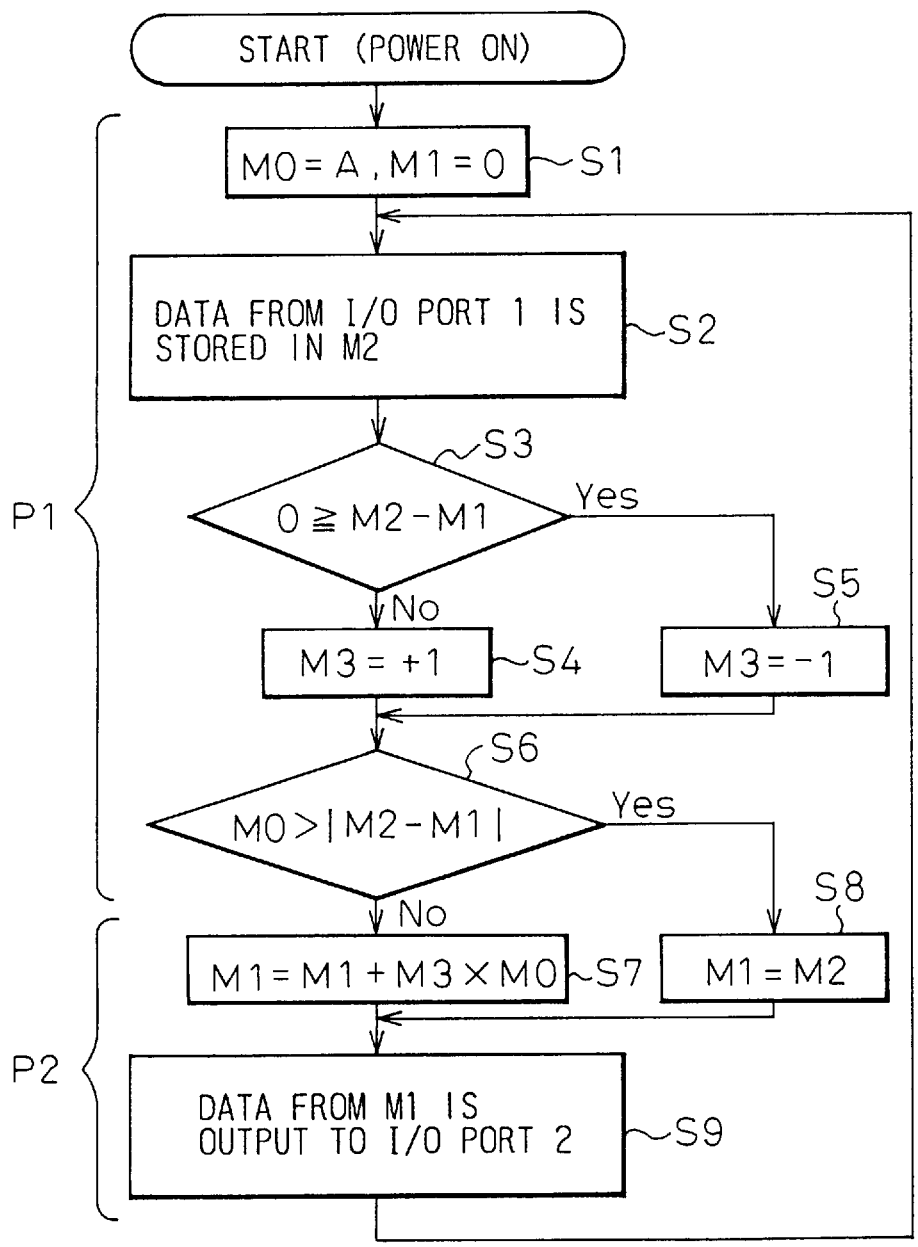
FIG. 8 is a flowchart showing an example of the operation of a digital signal processing unit 61 in FIG. 7.

FIG. 8 is a flow chart showing an example of the operation of the digital signal processing unit 61 in FIG. 7. In the figure, P1 corresponds to the variation amount monitoring processing, and P2 corresponds to the control amount limiting process.

For the above processes P1 and P2, the memory unit 65 of FIG. 7 is preliminarily classified into four memories M0, M1, M2, and M3.

(i) In the memory M0, a maximum value A of a magnitude of the control amount of the transmission power level in respective control periods is stored.

(ii) In the memory M1, the processing result of the control amount operated by the CPU 64 is stored for every control period.

(iii) In the memory M2, the detected output from the reception characteristic detection unit 11 read from the A/D converter 62 is stored for every control period.

(iv) In the memory M3, according to the result of comparison between the value of the memory M1 which is the processing result in the previous control period and the read and detected output in the present control period, −1 or +1 is stored. Concretely, +1 is stored in the memory M3 at every comparison when M2<M1 and −1 is stored in the memory M3 at every comparison when M2>M1.

Referring to FIG. 8, at step S1, the above A is stored in the memory M0, and 0 is stored in the memory M1. At first, there is no processing result, and accordingly M1 becomes equal to 0.

At step S2, the detected output read and fetched from the first I/O port 62 is stored in the memory M2.

At step S3, the difference between the value sampled at this time (the value of the memory M2) and the value sampled at the previous time (the value of the memory M1), that is the amounts of variation of these values are calculated.

At step S4, when 0>M2−M1 does not stand (NO), that is, when the amount of variation is shifted in a positive direction, −1 is stored in the memory M3; and at step S5, when 0>M2−M1 stands (YES), that is, when the amount of variation is shifted in a negative direction, +1 is stored in the memory M3.

At step S6, it is checked whether or not the amount of variation exceeds the maximum value A stored in the memory MO.

At step S7, when M0>|M2−M1| does not stand (NO), that is, when the above amount of variation exceeds the normal range, and therefore the amount of variation is shift toward positive (M3=−1), a value −MO(−A) is added to the value of the memory M1 and rewriting to M1 is carried out.

At step S8, MO>|M2−M1| stands (Yes) and normal, and therefore the value of the memory M2 is transferred to the memory M1 as it is.

At step S9, the thus obtained data of the memory M1 is output from the I/O port 67 as a value for determining the control signal.

Figure 9:
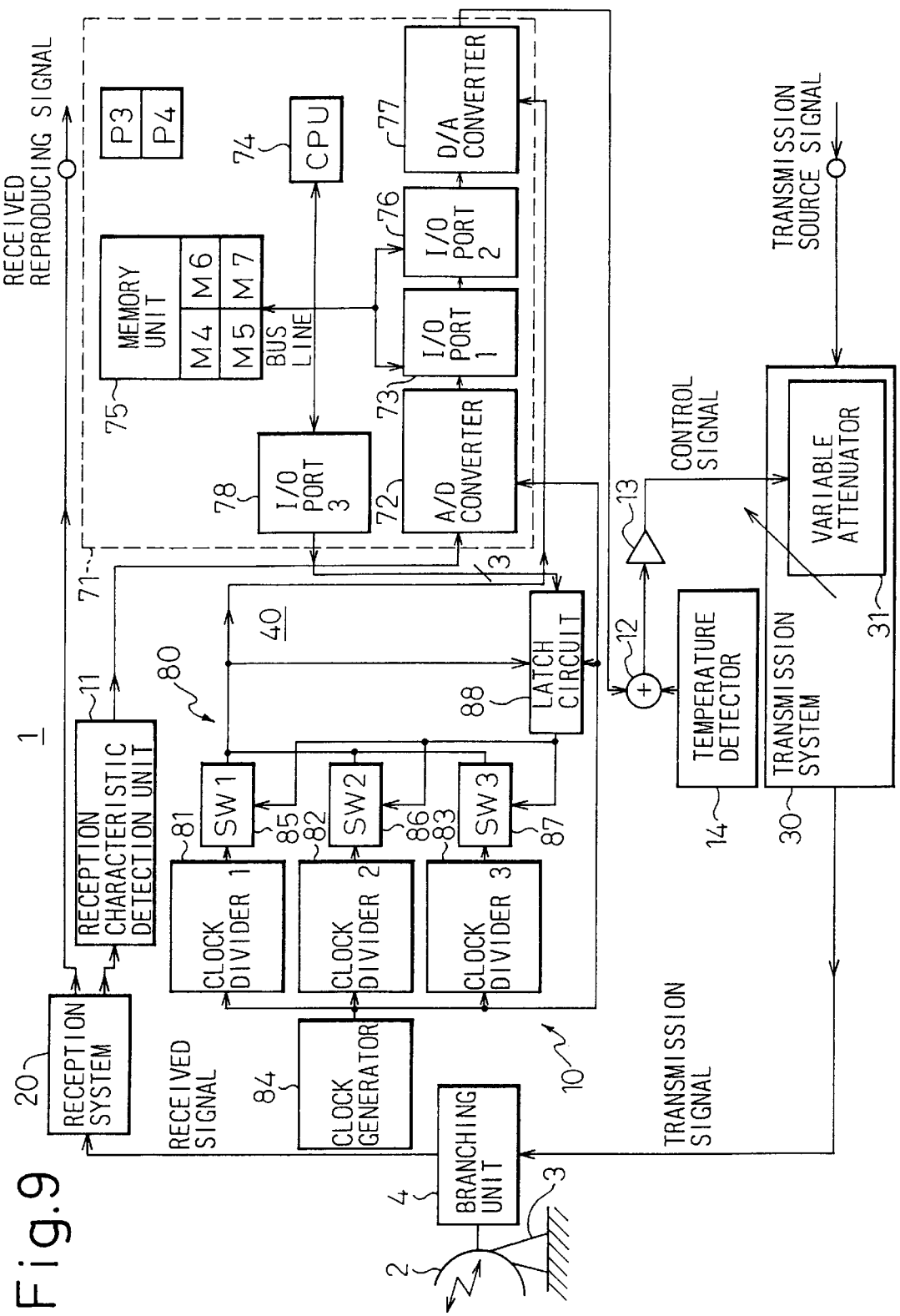
FIG. 9 is a view showing a concrete example of the third embodiment according to the present invention.

FIG. 9 is a view showing a concrete example of the third embodiment according to the present invention. In the figure, 71 is a digital signal processing unit, and 80 is a variable clock generating unit, which realize the function of the rain condition monitoring unit 44 and the variable control period setting unit 45 shown in FIG. 4 mainly by software processing. Note that, constituent elements 72, 73, 74, 75, 76, and 77 in the digital signal processing unit 71 are equivalent to the constituent elements 62, 63, 64, 65, 66, and 67 shown in FIG. 7, respectively. Note, in the case of FIG. 9, a third I/O port 78 is newly added. According to the output from this third I/O port 78, a variable clock corresponding to the above control period adjusted to long or short is output from the variable clock generating unit 80, and the CPU 74 operates according to this clock rate.

The variable clock generating unit 80 has for example the configuration as illustrated. First, second, and third clock dividers 81, 82, and 83 which convert the highest rate clock from the clock generator 84 to clock rates of a high speed, middle speed, and low speed, respectively are provided. The respective clock outputs from these clock dividers 81, 82, and 83 are alternately selected by the corresponding first, second, and third switches (SW1, SW2 and SW3) 85, 86, and 87. Which switch (85, 86, 87) is to be selected is determined by the output of a latch circuit 88. The latch circuit 88 receive the selection signal determined by the digital signal processing unit 71 and corresponding to the control period output from the third I/O port 78 and selects one of the switches 85, 86, and 87 based on this selection signal.

Note that, the A/D converter 72 reads the detected output from the reception characteristic detection unit 11 with the highest clock rate from the clock generator 84, and thus makes the control period variable at the D/A converter 77 on the output side. That is, the variable clock from the clock generating unit 80 is given only to the D/A converter 77.

The digital signal processing unit 71 executes two processes P3 and P4 for obtaining the clock of a desired clock rate from the variable clock generating unit 80. One is a rain condition monitoring process P3, and the other one is a variable control period setting process P4. The result of processing from the processing unit 71 is transmitted at the timing of the clock of the variable rate to be given to the D/A converter 77.

Figure 10:
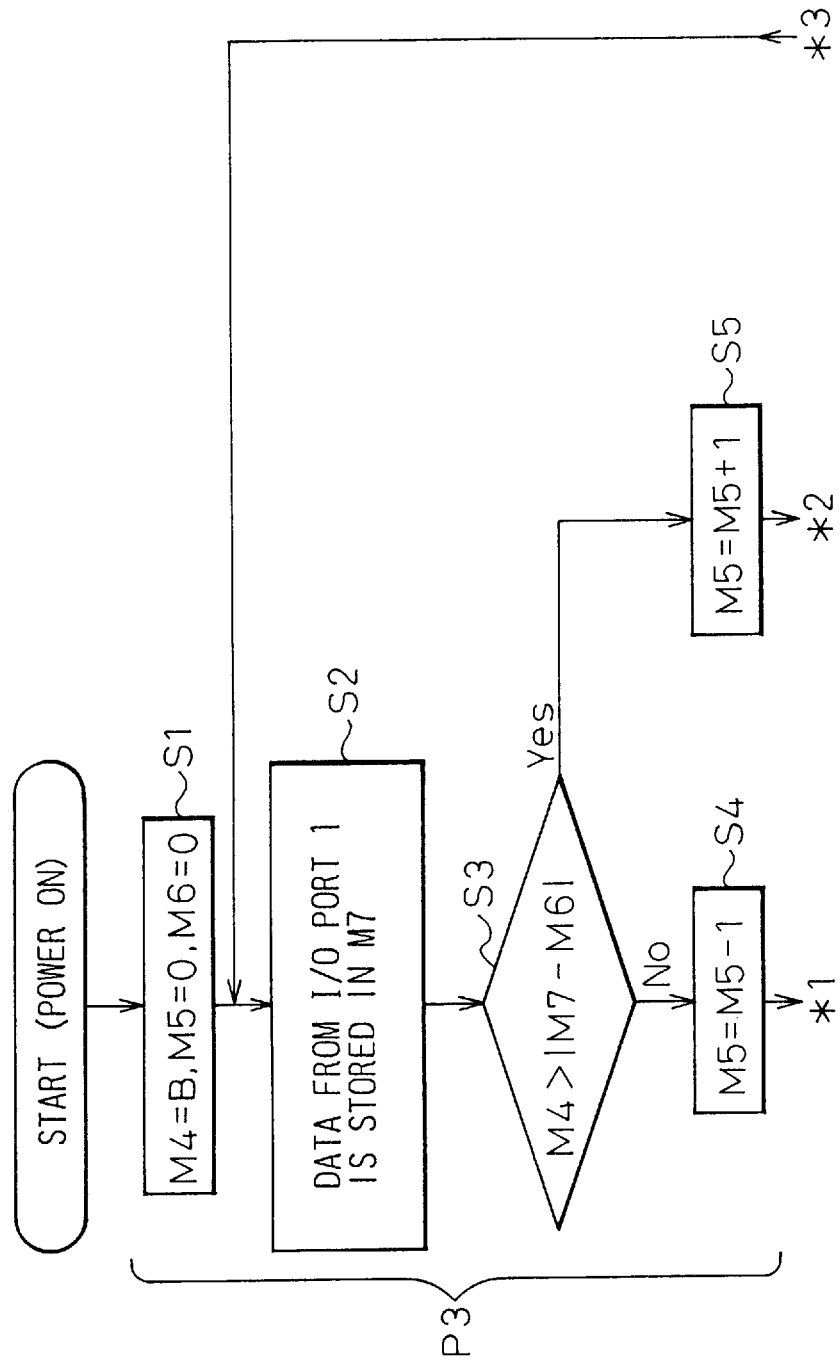
FIG. 10 is a first part of a flow chart showing an example of the operation of a digital signal processing unit 71 in FIG. 9.
Figure 11:
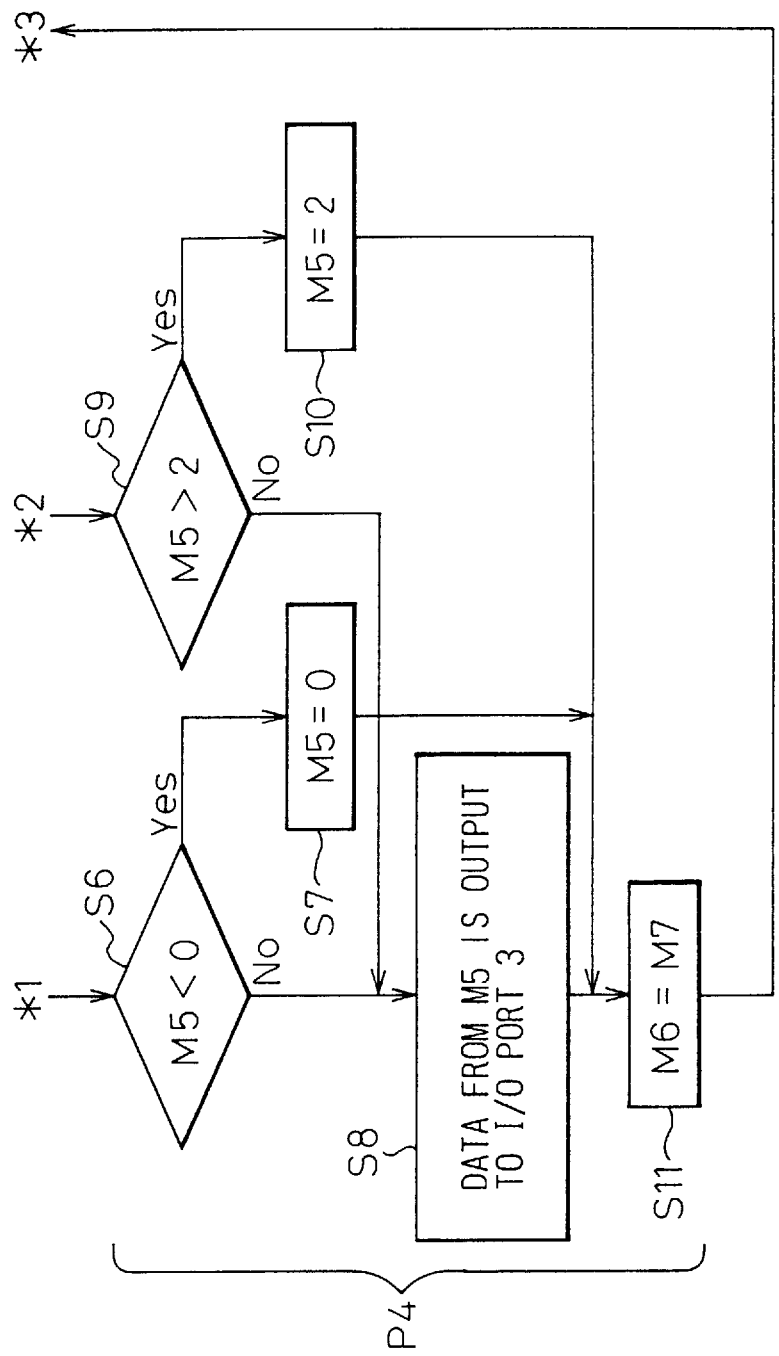
FIG. 11 is a second part of a flow chart showing an example of the operation of the digital signal processing unit 71 in FIG. 9.

FIG. 10 is a first flow chart showing an example of the operation of the digital signal processing unit 71 in FIG. 9; and FIG. 11 is a second flow chart showing the example of the operation of the digital signal processing unit 71 in FIG. 9. In the figures, the rain condition monitoring process P3 mainly belongs to FIG. 10, and the variable control period setting process P4 mainly belongs to FIG. 11.

For the processes P3 and P4, the memory unit 75 of FIG. 9 is preliminarily classified into four memories M4, M5, M6, and M7.

(i) In the memory M4, a decision reference value B at a decision of whether or not the clock rate should be varied according to a degree of the difference between the value of the detected output from the reception characteristic detection unit 11 sampled at this time and the detected output sampled at the previous time is stored.

(ii) In the memory M5, selection parameters (0, 1 and 2) determining which clock in a range from the clock divider 81 (high speed) to the clock divider 83 (low speed) should be selected are stored.

(iii) In the memory M6, the detected output obtained in the previous sampling (control period) is stored.

(iv) In the memory M7, the detected output obtained in this sampling (control period) is stored.

Referring to FIG. 10, at step S1, the above decision reference value B is stored in the memory M4, and the selection parameter "0" (high speed) is stored as an initial value in the memory M5. The memory M6 holds "0" since it is the first.

At step S2, the detected output read from the first I/O port 72 of FIG. 9 is stored in the memory M7.

At step S3, it is determined whether a difference between the value of the memory M6 (previous time) and the value of the memory M7 (this time) is larger or smaller than the reference value B in the memory M4.

At step S4, if the above difference is smaller than B (weak rain or fine weather), the selection parameter is decremented by 1 (to the low speed side) and the decremented parameter is stored in the memory M5.

At step S5, if the above difference is larger than B (strong rain), the selection parameter is incremented by 1 (to the high speed side) and the decremented parameter is stored in the memory M5.

Referring to FIG. 11, at step S6, it is examined whether or not the selection parameter has reached the limit of the high speed clock rate.

At step S7, the selection parameter has reached the limit of the high speed clock rate (Yes), therefore the clock rate specified by the memory M5 is held at the highest speed as it is.

At step S8, the data of the memory M5 is output from the third I/O port 77, and the above control signal is determined.

At step S9, it is examined whether or not the selection parameter has reached the limit of the low speed clock rate.

At step S10, the selection parameter has reached the limit of the low speed (Yes), and therefore the clock rate specified by the memory M5 is held at the lowest speed as it is. Note that, when the answer is "No" at step S9, at step S8, the memory M5 is rewritten by a value obtained by incrementing the selection parameter by 1 (step S5).

At step S11, the value of the memory M7 (this time) is written as the value for the memory M6 (previous time). Note that, in this control period, as the data determining the control signal, the data (previous time) stored in the memory M6 is used, and the value obtained this time is used as the data of a next time.

Figure 12:
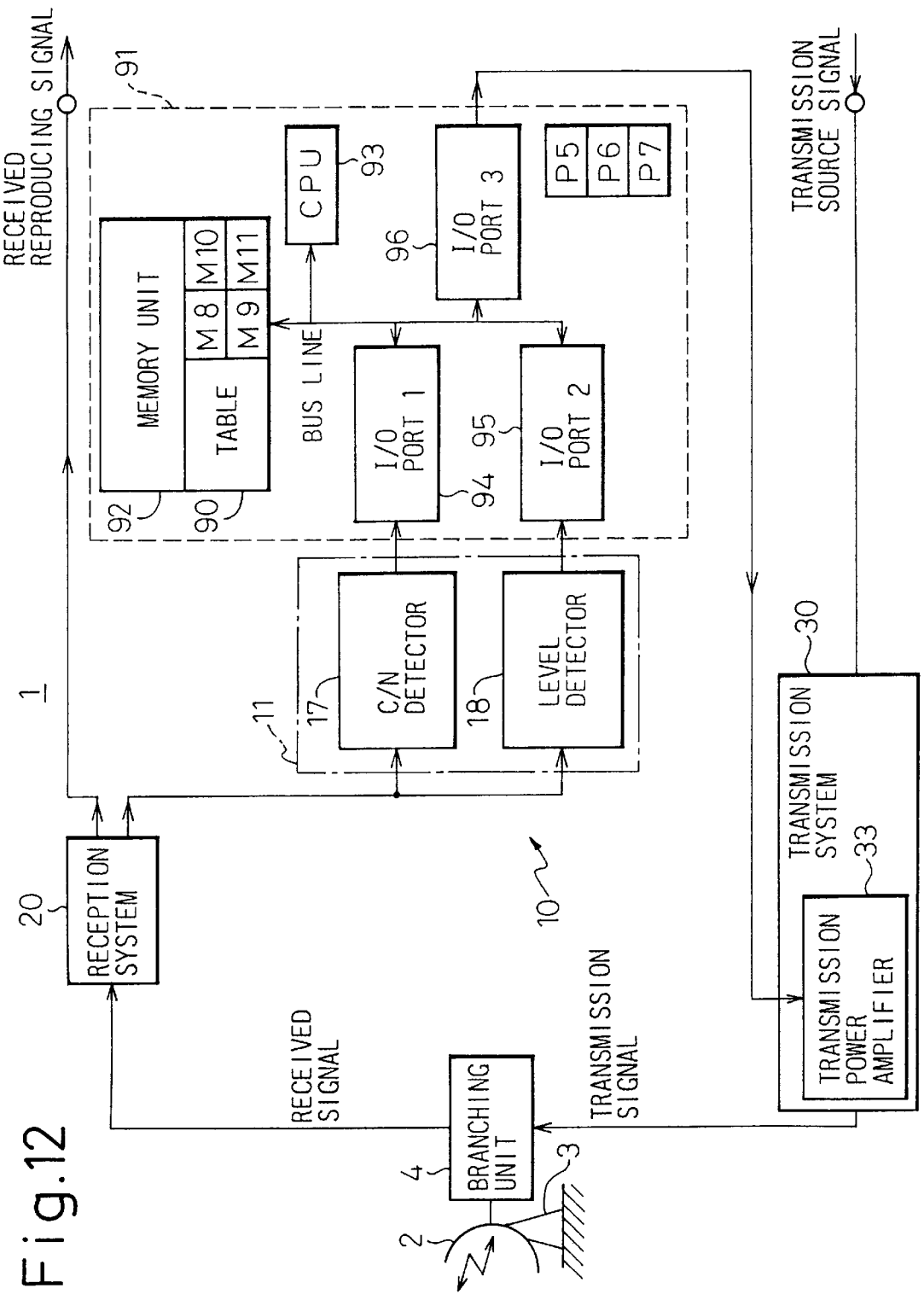
FIG. 12 is a view showing a concrete example of the fourth embodiment according to the present invention.

FIG. 12 is a view showing a concrete example of a fourth embodiment according to the present invention. In the figure, 91 is a digital signal processing unit which has a memory unit 92, a receiving level table 90, a CPU 93, and first, second, and third I/O ports 94, 95, and 96.

In this digital signal processing unit 91, corresponding to the functional units of FIG. 5 (46, 47, and 48), a characteristic monitoring process (P5), a table searching process (P6) and a level decision process (P7) are executed by software processing.

Figure 13:
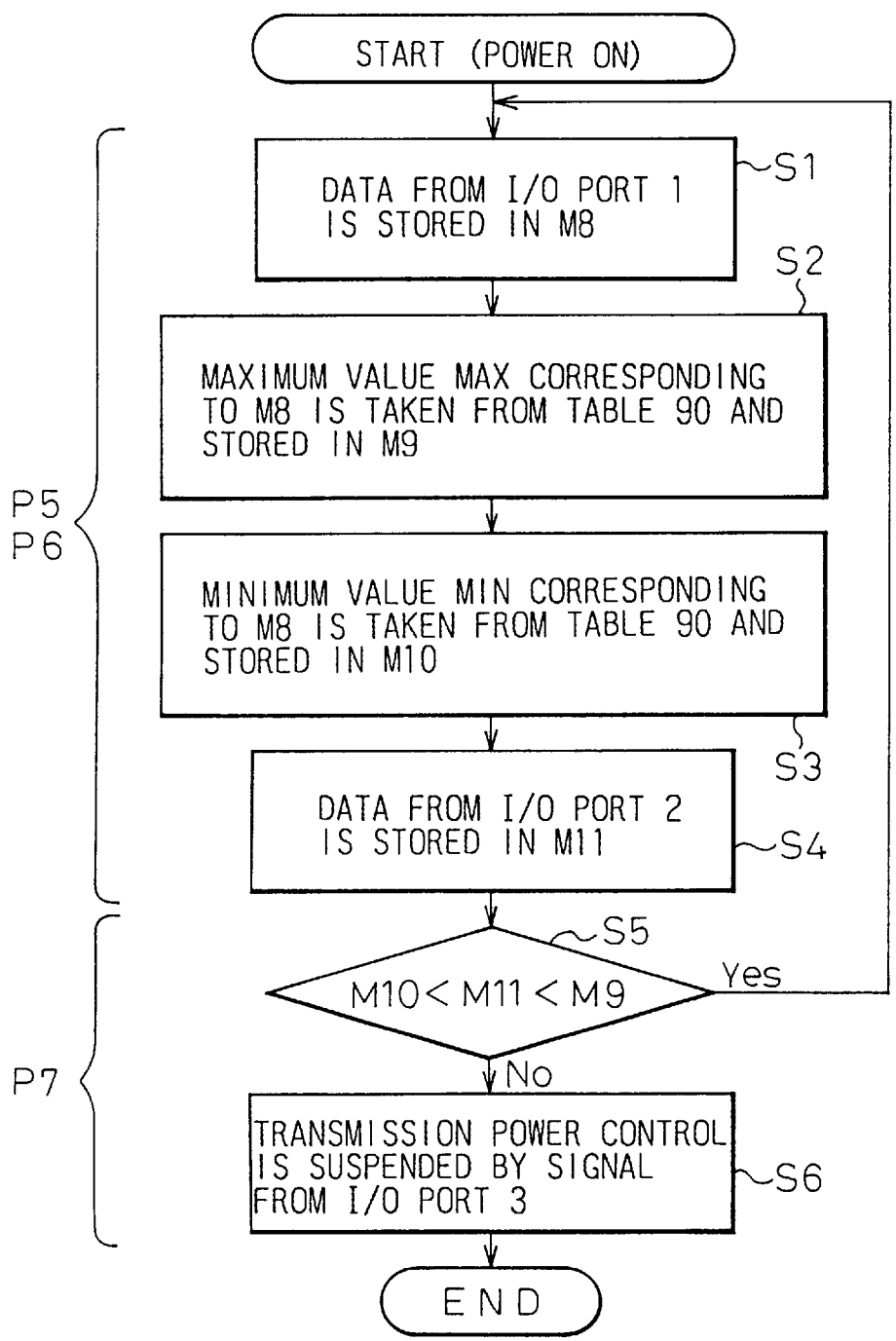
FIG. 13 is a flow chart showing an example of the operation of a digital signal processing unit 91 in FIG. 12.

FIG. 13 is a flow chart showing an example of the operation of the digital signal processing unit 91 in FIG. 12. In the figure, ranges belonging to the processes P5, P6, and P7 are indicated by these symbols. Note that, the configuration of the memory unit 92 is as follows.

The receiving level table 90 has the following contents as an example.

For C/N=68, a MAX of the receiving level=18 and a MIN=14 are allotted.

For C/N=69, a MAX of the receiving level=19 and a MIN=15 are allotted.

For C/N=70, a MAX of the receiving level=20 and a MIN=6 are allotted.

For C/N=71, a MAX of the receiving level=21 and a MIN=18 are allotted.

(i) The memory M8 stores the C/N (first detected output).

(ii) The memory M9 stores the maximum value (MAX) among the receiving levels corresponding to the C/N values from the detection unit 11.

(iii) The memory M10 stores the minimum value (MIN) among the receiving levels corresponding to the C/N values from the detection unit 11.

(iv) The memory M11 stores the receiving level (second detected output) from the detection unit 11.

At step S1, the read C/N value is stored in the memory M8.

At step S2, the maximum value (MAX) of the receiving level corresponding to the C/N value in that memory M8 is searched from the table 90 and stored in the memory M9.

At step S3, the minimum value (MIN) of the receiving level corresponding to the C/N value in the memory M8 is searched from the table 90 and stored in the memory M10.

At step S4, the receiving level from the detection unit 11 is stored in the memory M11.

At step S5, a comparison of magnitude is carried out for the contents of the memories M10, M11, and M9. If M10<M11<M9 has been established (Yes), it is normal. Conversely, if this relationship is not satisfied, that is, when the read receiving level (M11) is not within a range between the MAX (M9) and MIN (M10), it is abnormal.

At step S6, from the third I/O port 96, the control of the transmission power level with respect to the transmission system 30 is suspended.

Figure 14:
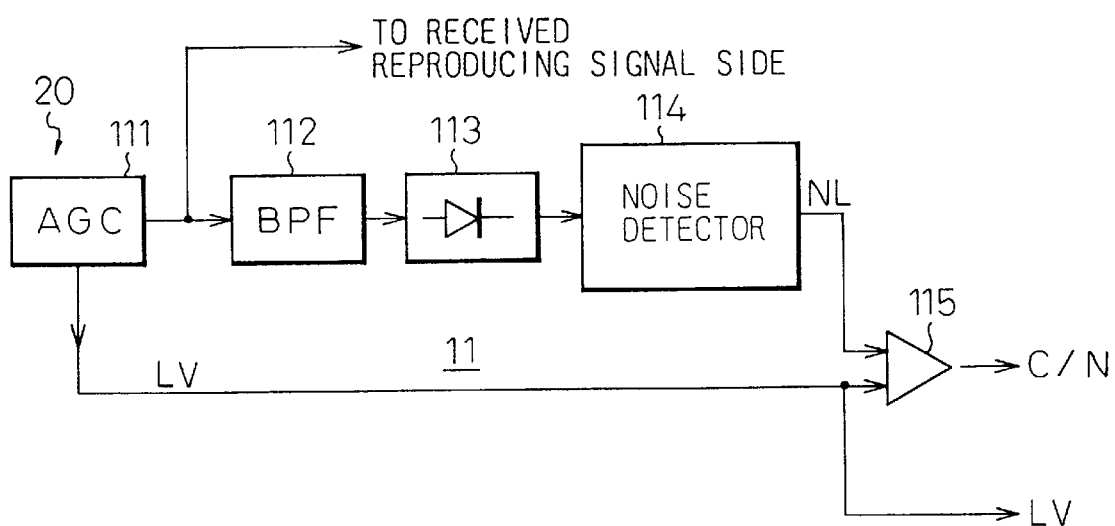
FIG. 14 is a view showing an example of a reception characteristic detection unit 11.

FIG. 14 is a view showing an example of the reception characteristic detection unit 11. In the figure, the reception characteristic detection unit 11 corresponds to a unit obtained by integrally constituting the C/N detector 17 and the level detector 18 shown in FIG. 6. Reference numeral 111 is an AGC circuit. Note, this AGC circuit 111 may not especially be provided as the reception characteristic detection unit 11, however, as one of the basic circuit group constituting the reception system 20, a unit originally included in this reception system 20 can be appropriated for use.

The AGC-controlled received signal from the AGC circuit 111 is applied to a band pass filter (BPF) 112 and only the predetermined noise band is extracted here. Further, a noise level NL is detected by a noise detector 114 through a detector 113. On the other hand, if an AGC component (feedback signal for making the carrier level constant) in the AGC circuit 111 is taken out, this AGC component becomes the level detection result LV by the level detector (18).

The detection result C/N of the C/N detector (17) is obtained by taking a difference between the above noise level NL and the level detection result LV by an operational amplifier 115.

It is completely unnecessary that the above four embodiments be independently introduced into the transmission power control apparatus 10. Rather than this, it is preferred if at least two among these four embodiments are combined and introduced. If possible, all of the four embodiments are combined and introduced. In this case, the above mentioned digital signal processing units 61, 71, and 91 serving as the hearts of the control status monitor/decision means 40 are realized by a single digital signal processing unit. Note, it is necessary to include all of the processing programs corresponding to the embodiments, which processing programs are sequentially and repeatedly executed.

As explained above, according to the present invention, a transmission power control apparatus which can maintain a further higher channel quality than that of the conventional apparatus is realized.

According to the first embodiment, the reliability of the reception characteristic detection unit 11, in which failures relatively easily occurs among the constituent elements constituting the earth station, can be greatly improved.

According to the second embodiment, a failure at the opposing earth station caused since the amount of control of the transmission power level designated by the control signal becomes excessive (out-of-lock at the demodulator) is prevented.

According to the third embodiment, the transmission power level can be controlled by the optimum control period classified between the time of rain and the time of fine weather.

According to the fourth embodiment, a failure caused in any of the antenna driving unit and the low noise amplifies in the reception system can be discovered, and when such a failure occurs, the transmission of the transmission signal is immediately suspended, or the transmission of the transmission signal can be continued while fixing its level to a preliminarily determined prescribed level.

What is claimed is:

1. A transmission power control apparatus in an earth station for satellite communication comprising:

a reception system processing a signal received from an antenna, a transmission system processing a signal transmitted to said antenna, a transmission power control apparatus including a reception characteristic detection unit which detects a reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said reception characteristic detection unit has a first reception characteristic detector and a second reception characteristic detector;

said control status monitor/decision means includes a detection output switching unit which in a normal mode uses a detected output from one of the first reception characteristic detector and second reception characteristic detector as said control signal and while deciding whether the value of said detected output is outside a preliminarily determined normal range, performs switching to a detected output from the other of said first reception characteristic detector and second reception characteristic detector, and uses the detected output from the other as said control signal, and wherein said detection output switching unit has a threshold value circuit which has a first threshold value for deciding whether the first detected output from said first reception characteristic detector is normal or abnormal and a second threshold value for deciding whether the second detected output from said second reception characteristic detector is normal or abnormal and outputs a switch opening/closing signal according to the decision;

a first switch which passes or blocks said first detected output by said switch opening/closing signal; and a second switch which passes or blocks said second detected output by said switch opening/closing signal, and said threshold value circuit selects one of said first detected output and second detected output in the normal mode and uses the same as said control signal and, while deciding whether the related detected output is abnormal, performs switching to the other detected output and uses the other detected output as said control signal.

2. A transmission power control apparatus in an earth station for satellite communication comprising:

a reception system processing a signal received from an antenna, a transmission system processing a signal transmitted to said antenna, a transmission power control apparatus including a reception characteristic detection unit which detects reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a variation amount monitoring unit which periodically samples the detected output from said reception characteristic detection unit, calculates an amount of variation between a value sampled at this time and the value sampled at a previous time, and monitors whether or not the amount of variation is within a preliminarily determined normal range; and a control amount limiting unite which limits a magnitude of the amount of control of said transmission power level which should be designated by said control signal when said amount of variation becomes out of said preliminarily determined normal range, to the preliminarily determined normal amount of control.

3. A transmission power control apparatus in an earth station for satellite communication comprising:

a reception system processing a signal received from an antenna, a transmission system processing a signal transmitted to said antenna, a transmission power control apparatus including a reception characteristic detection unit which detects the reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a digital signal processing unit executing a variation amount monitoring process (P1) for periodically sampling the detected output from said reception characteristic detection unit, calculating an amount of variation between the value sampled at this time and the value sampled at a previous time and monitoring whether or not the amount of variation is within a preliminarily determined normal range; and a control amount limiting process (P2) for limiting a magnitude of the amount of control of said transmission power level, which should be designated by said control signal when said amount of variation becomes out of said preliminarily determined normal range, to the preliminarily determined normal amount of control.

4. A transmission power control apparatus in an earth station for satellite communication comprising a reception system processing a signal received from an antenna, a transmission system processing a signal transmitted to said antenna, a transmission power control apparatus including a reception characteristic detection unit which detects the reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a rain condition monitoring unit which monitors the detected output from said reception characteristic detection unit and monitors the rain condition in the space transmission paths between said antenna and satellite and a variable control period setting unit which makes a control period of said transmission power level by said control signal short when it is decided that the rain condition is strong rain by said rain condition monitoring unit, and makes the control period of said transmission power level by said control signal long when it is decided the condition is weak rain or fine weather.

5. A transmission power control apparatus in an earth station for satellite communication comprising:

a reception system processing a signal received from an antenna, a transmission system processing a signal transmitted to said antenna, a transmission power control apparatus including reception characteristic detection unit which detects a reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a digital signal processing unit which executes a rain condition monitoring process (P3) for monitoring the detected output from said reception characteristic detection unit and for monitoring the rain condition in space transmission paths between said antenna and satellite, and a variable control period setting process (P4) for setting the control period of said transmission power level by said control signal short when it is decided the condition is strong rain by said rain condition monitoring process (P3) and setting the control period of said transmission power level by said control signal long when it is decided the condition is weak rain or fine weather; and a variable clock generating unit which generates a clock of a variable rate according to said control period set by said variable control period setting process (P4) and determines transmission timing of the processing result to be output from said digital signal processing unit.

6. A transmission power control apparatus in an earth station for satellite communication comprising a reception system processing a signal received from an antenna, a transmission system processing a signal transmitted to said antenna, a transmission power control apparatus including a reception characteristic detection unit which detects a reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a characteristic monitoring unit which monitors the first detected output for a carrier vs. noise ratio (C/N) of said received signal detected in said reception characteristic detection unit and the second detected output for the receiving level of said received signal, respectively;

a table searching unit which includes a receiving level table for preliminarily storing maximum values and minimum values of said receiving levels which can exist under said C/N values corresponding to said various different C/N values, searches said receiving level table by said first detected output from said characteristic monitoring unit, and outputs the maximum value and minimum value of a corresponding receiving level; and a level decision unit which suspends control of said transmission power level with respect to said transmission system when deciding whether said second detected output from said characteristic monitoring unit becomes out of the range of the maximum value and the minimum value of said receiving level.

7. A transmission power control apparatus in an earth station for satellite communication comprising a reception system processing a signal received from an antenna, a transmission system processing a signal transmitted to said antenna, a transmission power control apparatus including a reception characteristic detection unit which detects a reception characteristic of said received signal in said reception system and changes a transmission power level of said transmission signal in said transmission system according to a change of said reception characteristic, and a control status monitor/decision means which monitors a control status in said transmission power control apparatus, decides an optimum transmission power level according to said control status, and varies said transmission power level by a control signal based on a result of the decision, wherein said control status monitor/decision means includes a digital signal processing unit which executes a characteristic monitoring process (P5) for monitoring the first detected output for a carrier vs. noise ratio (C/N) of said received signal detected in said reception characteristic detection unit and the second detected output for the receiving level of said received signal;

a table searching process (P6) which includes a receiving level table preliminarily storing maximum values and minimum values of said receiving levels which can exist under said C/N values corresponding to said various different C/N values, searches said receiving level table by said first detected output by said characteristic monitoring process (P5), and outputs the maximum value and the minimum value of said corresponding receiving level; and a level decision process (P7) for suspending control of said transmission power level with respect to said transmission system while deciding whether said second detected output by said characteristic monitoring process (P5) becomes out of a range of the maximum value and the minimum value of said receiving level.

8. A transmission power control apparatus in an earth station for satellite communication comprising:

a reception system processing a signal received from an antenna, a transmission system processing a signal transmitted to said antenna, a transmission power control apparatus including a plurality of reception characteristic detectors which differ in method for detection of a reception characteristic of said received signal in said reception system and change a transmission power level of said transmission signal in said transmission system according to a change of said reception characteristic, a control status monitor/decision means for monitoring a control status in said transmission power control apparatus, deciding an optimum level of said transmission power according to said control status, and varying said transmission power level by the control signal based on a result of the decision, wherein said control status monitor/decision means includes a detection output switching unit which in a normal mode uses a detected output from one of the plurality of reception characteristic detectors as said control signal and, while deciding whether a value of said detected output falls out of a preliminarily determined normal range, performs switching to a detected output from another of the plurality of reception characteristic detectors, and uses the detected output from said other as said control signal.

* * * * *